April 3, 1951 A. G. KEARNS 2,547,581
POWER TRANSMISSION AND CONVEYER LINE
Filed July 3, 1948
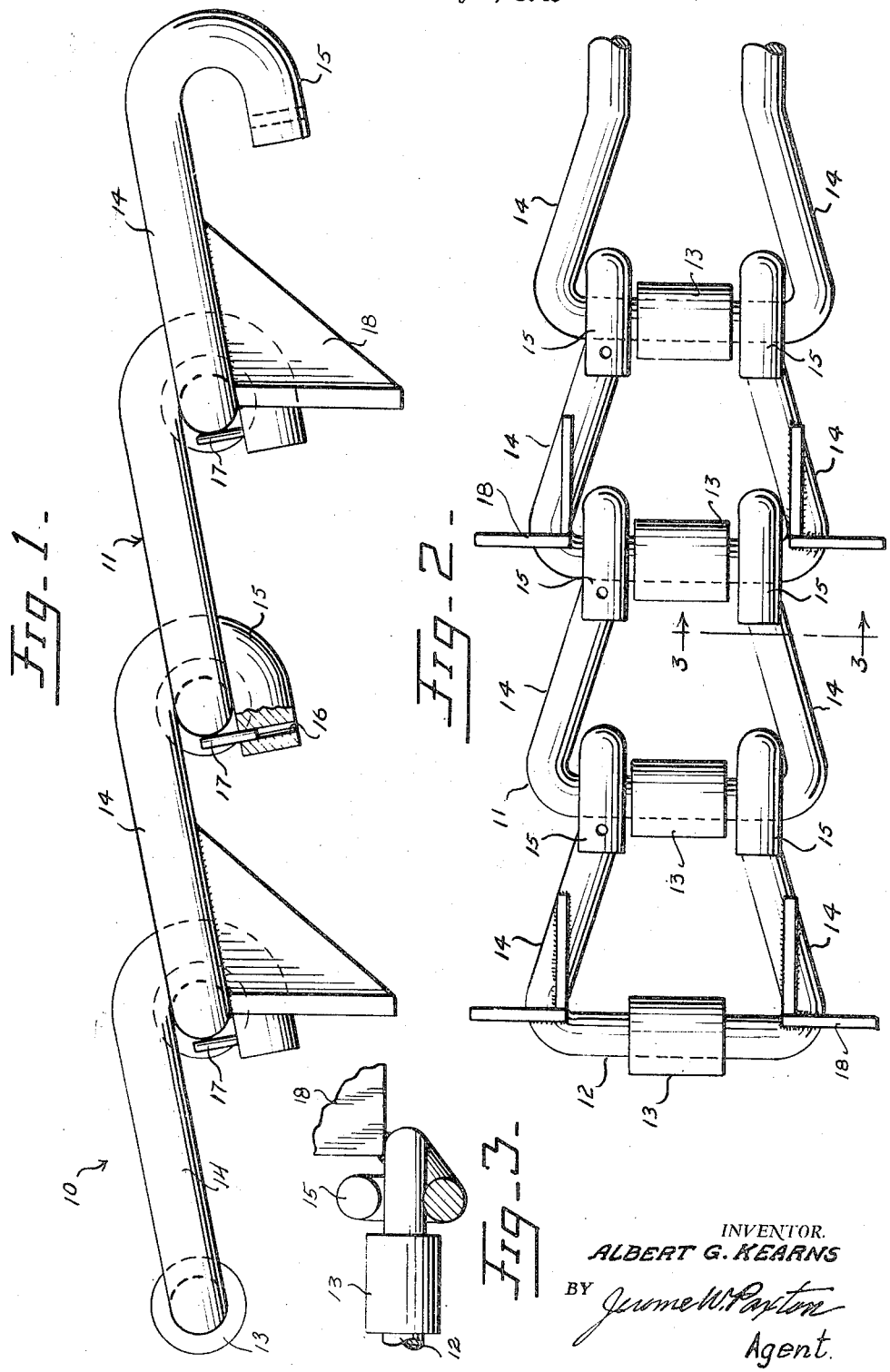
INVENTOR.
ALBERT G. KEARNS
BY Jerome W. Paxton
Agent.

Patented Apr. 3, 1951

2,547,581

UNITED STATES PATENT OFFICE 2,547,581

POWER TRANSMISSION AND CONVEYER LINE

Albert G. Kearns, White Haven, Pa.

Application July 3, 1948, Serial No. 36,883

4 Claims. (Cl. 74—249)

The present invention in its broadest aspect relates to a chain for use in power transmission, conveyor and similar lines, and in its more specific aspect has reference to the link structure of which the chain is fabricated.

At the present time, most chain assemblies of the type under consideration have been of the character wherein the individual links are permanently attached to each other. This means that in the event of breakage or serious damage to any particular link or links, considerable time must be expended to remove the damaged part and replace it with either a new or repaired link. Manifestly, this is undesirable from the economic point of view, and this particular characteristic has always been one of the objectionable features to this type of chain. Attempts have been made to provide a chain wherein their is no more or less permanent connection between adjacent links of the chain, thus enabling any particular link or links to be readily removed from the chain, should the occasion arise. However, this type of chain has not proven satisfactory under operating conditions in view of the fact that the individual links tend to distort when strain is imposed during driving of the chain which, of course, renders the chain useless from a practical point of view. Moreover, this type of chain has the tendency to ride or jump the sprockets which is another serious defect.

Accordingly, one of the cardinal objects of my invention is to provide a chain assembly of the character described which overcomes the above and other objectionable features now present in the art.

Another object of this invention is to provide a link which may be readily connected with or disconnected from an adjacent link of similar structural detail in a minimum of time and with ease of operation.

A further object of my invention is to provide a link assembly wherein the side arms of the link converge at their free ends at such an angle as to provide maximum strength.

Another object of my invention is to provide a link structure of the type finding particular application in the manufacture of power transmission and conveyor chains wherein a novel locking element is provided on at least one of the free ends of the link for cooperating with the cross bar of the adjacent link for maintaining the respective links in proper position relative to each other and yet which can be quickly removed for enabling the links to be disconnected.

Yet another object of my invention is to provide a link of the character set forth, wherein the side bars of the link are so formed as to guide the tooth of the sprocket against a revoluble bushing on the cross arm of the link, thereby eliminating any possibility of the chain riding or jumping the sprocket.

To accomplish the above and other objects, the invention broadly encompasses the idea of forming the link with a cross bar having a revoluble bushing mounted thereon, forming the side bars of the link at such an angle with respect to the cross bar that the inner ends terminate in hook-like elements for at least partially encircling the cross bar of the adjacent link on opposite ends of its revoluble bushing, thereby providing maximum strength and incorporating a removable locking member with at least one of the hook-like elements for maintaining the respective links in the desired relation.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation illustrating a fragment of a chain embodying my inventive concept, a portion of the hook-like element of one of the links being in section;

Figure 2 is a top plan view of the chain shown in Figure 1; and

Figure 3 is a sectional view taken along the line 3—3 of Figure 2, looking in the direction of the arrow.

Referring to the drawings, and more particularly Figure 1, I have shown a fragment of a sprocket chain made up of my novel individual link structure designated generally 10, and since each link is similar in detail, the ensuing description will be limited to but one link. The link 10 is formed from a bar 11 of round, cold rolled steel, and the length and diameter of the bar depends upon the particular strength chain required. The bar 11 is subjected to any suitable forming process to provide a cross bar 12, and a revoluble bushing or roller 13 is located on the bar 12 intermediate the ends thereof formed of a softer metal than the bar. If desired, the bushing 13 may be of the split type and subsequently disposed around the cross bar 12.

A side bar 14 extends from each end of the cross bar 12 and it will be noted that each of the side bars converges adjacent its free ends and terminates in a hook-like element 15 directed rearwardly toward the cross bar 12 and the hook-like element is approximately parallel to the side bar 14. As shown in Figure 1, the hook-like element 15 is of such length as to extend a substantial distance beyond the outer circumference of the bushing 13.

To assemble the chain, one link 10 is disposed at right angles to the adjacent link with the cross bar 12 resting upon the side bars 14 and with the roller 13 disposed intermediate the hook-like element 15. The cross bar is then moved into engagement with the hook-like elements and the link is then rotated through a 90 degree angle. In this position the respective links cannot become disengaged, due to the fact that on longitudinal movement of the links, the hook-like elements 15 will engage the converging side bars 14. To further insure that the links will not become disconnected, it can be seen that one of the hook-like elements 15 is formed with a vertical bore 16 extending therethrough. A pin 17 is driven through the bore 16 and is of a length such as to terminate a short distance above the side bar 14. Clearly, the pin 17 will prevent the cross bar 12 from being accidentally moved rearwardly from the hook-like elements 15. It will be noted that the distance between the lower end of the pin 17 and the upper face of the side bar 14 is greater than the length of the pin remaining in the bore 16. This particular arrangement is very important since it means that in the event it is desired to remove one of the links for replacement or repair purposes, the workman has merely to insert a suitable tool into the upper end of the bore and the pin 17 may be driven out of the bore to enable the links to be disconnected.

Any suitable attachments may be connected to any desired link, and for the purpose of illustration I show a flight attachment 18 which is secured by welding or the like to the side bars 14 adjacent their juncture with the cross bar 12.

When the links have been assembled to provide the chain assembly, it will be observed that the side bars 14 converge at such an angle as to provide maximum strength by receiving straight pull. Also, when the chain passes over the sprocket, the converging side bars 14 will guide the tooth of the sprocket against the bushing 13 on the cross bar 12 of the adjacent link and hence eliminate any possibility of the chain riding or jumping the sprocket. Furthermore, the revoluble bushing will reduce wear on the sprocket as well as on the chain and this, of course, is most desirable.

By varying the length of the link and the diameter of the steel stock, the chain may be manufactured in any desired pitch.

Under actual operating conditions, the ultimate strength of a 2 5/8 pitch chain fabricated of 1040 1/2 inch round cold rolled steel proved to be between 12,000 and 14,000 pounds without any distortion of the link. It is clear, therefore, that the link possesses excellent wearing qualities.

I claim:

1. A link for chain drives comprising a cross bar, a revoluble bushing on said cross bar, a side bar extending from each end of the cross bar, the said side bars converging at their free ends, a hook-like element at the free end of each of said side bars, said hook-like elements being adapted to engage the cross bar of an adjacent link on opposite ends of the revoluble bushing, and a removable locking member carried by one of said hook-like elements adapted to engage the cross bar and prevent said cross bar from leaving the hook-like elements.

2. A link for chain drives comprising a cross bar, a revoluble bushing on the cross bar, a side bar extending from each end of the cross bar, the said side bars converging at their free ends, a hook-like element at the free end of each of said side bars, said hook-like elements being adapted to engage the cross bar of an adjacent link on opposite sides of the revoluble bushing, and a removable pin supported by one of said hook-like elements adapted to engage the cross bar and prevent said cross bar from leaving the hook-like elements.

3. A link for chain drives comprising a cross bar, a side bar extending from each end of the cross bar, the said side bars converging at their free ends, a hook-like element at the free end of each of said side bars, said hook-like elements being adapted to engage the cross bar of an adjacent link, one of said hook-like elements being provided with a bore extending therethrough, and a pin located in said bore so that the lower end of the pin will prevent the cross bar from leaving the hook-like elements.

4. A link for chain drives comprising a cross bar, a side bar extending from each end of the cross bar, the said side bars converging at their free ends, a hook-like element at the free end of each of said side bars, said hook-like elements being adapted to engage the cross bar of an adjacent link, one of said hook-like elements being provided with a bore extending therethrough, and a pin located in said bore so that the lower end of the pin will prevent the cross bar from leaving the hook-like elements, the length of the pin being such that the distance between the lower end of the pin and the side bar is greater than the length of the pin disposed within the bore.

ALBERT G. KEARNS.

REFERENCES CITED

The following references are of record in the file of this patent:

UNITED STATES PATENTS

| Number | Name | Date |
| --- | --- | --- |
| 94,757 | King et al. | Sept. 14, 1869 |
| 494,110 | Maxon | Mar. 21, 1893 |
| 756,481 | Dupuis | Apr. 5, 1904 |
| 993,248 | Hayward | May 23, 1911 |